US009744852B2

(12) United States Patent
Buttolo et al.

(10) Patent No.: US 9,744,852 B2
(45) Date of Patent: Aug. 29, 2017

(54) INTEGRATION OF ADD-ON INTERIOR MODULES INTO DRIVER USER INTERFACE

(71) Applicant: Ford Global Technologies, LLC, Dearborn, MI (US)

(72) Inventors: Pietro Buttolo, Dearborn Heights, MI (US); Stephen Ronald Tokish, Sylvania, OH (US); James Stewart Rankin, II, Novi, MI (US); Stuart C. Salter, White Lake, MI (US); Gary Steven Strumolo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/850,312

(22) Filed: Sep. 10, 2015

(65) Prior Publication Data
US 2017/0072794 A1    Mar. 16, 2017

(51) Int. Cl.
*B60K 35/00* (2006.01)
*G06F 3/14* (2006.01)
(Continued)

(52) U.S. Cl.
CPC .......... *B60K 35/00* (2013.01); *G06F 3/04817* (2013.01); *G06F 3/04842* (2013.01);
(Continued)

(58) Field of Classification Search
CPC .............. G06F 3/1423; G06F 3/04842; G06F 3/04817; G06F 3/167; G06F 7/00; H04L 67/303
See application file for complete search history.

(56) References Cited

U.S. PATENT DOCUMENTS 4,721,954 A    1/1988  Mauch
4,792,783 A *  12/1988 Burgess ................. B60K 35/00
                                                     307/10.1
(Continued)

FOREIGN PATENT DOCUMENTS

CN    102445954 B    3/2014
CN    103942963 A    7/2014
(Continued)

OTHER PUBLICATIONS

Rasin, "An In/Vehicle Human/Machine Interface Module," XML Journal, Jan. 3, 2003, (9 pages), retrieved from http://xml.sys/con.com/node/40547 on Dec. 13, 2014.
(Continued)

*Primary Examiner* — Tuan C. To
(74) *Attorney, Agent, or Firm* — Jennifer M. Stec; Brooks Kushman P.C.

(57) ABSTRACT

A listing of wireless in-vehicle components installed to a vehicle may be maintained by the vehicle. The listing may include in-vehicle components that are factory-installed to the vehicle as well as add-on in-vehicle components that may be added or removed by a user. A wireless transceiver may scan for changes to the add-on in-vehicle components within the vehicle. A user interface may display a unified interface including both the factory-installed wireless in-vehicle components and the add-on wireless in-vehicle components. A user may review and adjust the configuration of the in-vehicle components of the in-vehicle components using the user interface.

18 Claims, 9 Drawing Sheets

(51) Int. Cl.
*G06F 3/0484* (2013.01)
*G06F 7/00* (2006.01)
*G06F 3/16* (2006.01)
*G06F 3/0481* (2013.01)

(52) U.S. Cl.
CPC ............ *G06F 3/1423* (2013.01); *G06F 3/167* (2013.01); *G06F 7/00* (2013.01)

(56) References Cited

U.S. PATENT DOCUMENTS

| | | | |
|---|---|---|---|
| 4,962,302 A | 10/1990 | Katsumi | |
| 5,132,880 A | 7/1992 | Kawamura | |
| 5,143,437 A | 9/1992 | Matsuno et al. | |
| 5,543,591 A | 8/1996 | Gillespie et al. | |
| 5,648,656 A | 7/1997 | Begemann et al. | |
| 5,650,929 A | 7/1997 | Potter et al. | |
| 5,697,844 A * | 12/1997 | Von Kohorn | H04N 7/0884 348/E7.024 |
| 5,757,268 A * | 5/1998 | Toffolo | B60K 35/00 340/459 |
| 5,796,179 A | 8/1998 | Honaga | |
| 5,848,634 A * | 12/1998 | Will | E06B 9/174 160/1 |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 * | 9/2002 | Goldberg | G06F 9/54 701/32.7 |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,706,740 B2 | 4/2010 | Collins et al. | |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,065,169 B1 * | 11/2011 | Oldham | G06Q 40/00 705/35 |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 | 4/2013 | Wilson et al. | |
| 8,417,258 B2 | 4/2013 | Barnes, Jr. | |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,797,295 B2 | 8/2014 | Bernstein et al. | |
| 8,823,517 B2 | 9/2014 | Hadsall, Sr. | |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 | 11/2014 | Dobyns | |
| 8,930,045 B2 | 1/2015 | Oman et al. | |
| 8,947,202 B2 | 2/2015 | Tucker et al. | |
| 9,053,516 B2 | 6/2015 | Stempora | |
| 9,078,200 B2 | 7/2015 | Wuergler et al. | |
| 9,350,809 B2 | 5/2016 | Leppanen | |
| 9,417,691 B2 | 8/2016 | Belimpasakis et al. | |
| 2002/0069002 A1 | 6/2002 | Morehouse | |
| 2002/0070923 A1 | 6/2002 | Levy et al. | |
| 2002/0087423 A1 * | 7/2002 | Carbrey Palango | G06Q 10/087 705/26.5 |
| 2002/0092019 A1 * | 7/2002 | Marcus | G11B 27/034 725/37 |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0076015 A1 * | 4/2004 | Aoki | B60H 1/00735 362/503 |
| 2004/0215532 A1 | 10/2004 | Boman et al. | |
| 2005/0040933 A1 | 2/2005 | Huntzicker | |
| 2005/0099320 A1 * | 5/2005 | Nath | G06Q 30/0284 340/933 |
| 2005/0136845 A1 | 6/2005 | Masuoka et al. | |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0205456 A1 * | 9/2006 | Bentz | A63F 13/10 463/1 |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0198472 A1 | 8/2007 | Simonds et al. | |
| 2007/0201389 A1 | 8/2007 | Murayama | |
| 2007/0262140 A1 * | 11/2007 | Long | G06Q 20/04 235/380 |
| 2008/0140868 A1 * | 6/2008 | Kalayjian | G06F 1/1698 710/8 |
| 2008/0180231 A1 | 7/2008 | Chen | |
| 2008/0261643 A1 | 10/2008 | Bauer et al. | |
| 2008/0288406 A1 | 11/2008 | Seguin et al. | |
| 2009/0253439 A1 | 10/2009 | Gantner et al. | |
| 2010/0091394 A1 | 4/2010 | DeWind et al. | |
| 2010/0176917 A1 | 7/2010 | Bacarella | |
| 2010/0197359 A1 | 8/2010 | Harris | |
| 2010/0216401 A1 | 8/2010 | Kitahara | |
| 2010/0222939 A1 | 9/2010 | Namburu et al. | |
| 2010/0225443 A1 | 9/2010 | Bayram et al. | |
| 2010/0231958 A1 | 9/2010 | Okigami | |
| 2010/0233957 A1 | 9/2010 | Dobosz | |
| 2010/0280711 A1 | 11/2010 | Chen et al. | |
| 2010/0315373 A1 | 12/2010 | Steinhauser et al. | |
| 2011/0086668 A1 | 4/2011 | Patel | |
| 2011/0137520 A1 | 6/2011 | Rector et al. | |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2012/0006611 A1 | 1/2012 | Wallace et al. | |
| 2012/0065815 A1 | 3/2012 | Hess | |
| 2012/0096908 A1 | 4/2012 | Fuse | |
| 2012/0109451 A1 | 5/2012 | Tan | |
| 2012/0136802 A1 * | 5/2012 | McQuade | G06Q 30/0282 705/347 |
| 2012/0214463 A1 | 8/2012 | Smith et al. | |
| 2012/0214471 A1 | 8/2012 | Tadayon et al. | |
| 2012/0229253 A1 | 9/2012 | Kolar | |
| 2012/0244883 A1 | 9/2012 | Tibbitts et al. | |
| 2012/0254809 A1 | 10/2012 | Yang et al. | |
| 2012/0268235 A1 | 10/2012 | Farhan et al. | |
| 2012/0268242 A1 | 10/2012 | Tieman et al. | |
| 2013/0015951 A1 | 1/2013 | Kuramochi et al. | |
| 2013/0079951 A1 | 3/2013 | Brickman | |
| 2013/0099892 A1 | 4/2013 | Tucker et al. | |
| 2013/0116012 A1 | 5/2013 | Okayasu | |
| 2013/0218371 A1 * | 8/2013 | Simard | B60W 50/08 701/2 |
| 2013/0259232 A1 | 10/2013 | Petel | |
| 2013/0300608 A1 | 11/2013 | Margalef et al. | |
| 2013/0329111 A1 | 12/2013 | Desai et al. | |
| 2013/0335222 A1 | 12/2013 | Comerford et al. | |

(56) References Cited

U.S. PATENT DOCUMENTS

| | | |
|---|---|---|
| 2014/0043152 A1 | 2/2014 | Lippman et al. |
| 2014/0068713 A1* | 3/2014 | Nicholson ............. H04W 12/06 726/3 |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0309806 A1 | 10/2014 | Ricci |
| 2014/0321321 A1 | 10/2014 | Knaappila |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0147974 A1 | 5/2015 | Tucker et al. |
| 2015/0148990 A1 | 5/2015 | Patel |
| 2015/0149042 A1 | 5/2015 | Cooper et al. |
| 2015/0154531 A1 | 6/2015 | Skaaksrud |
| 2015/0172902 A1 | 6/2015 | Kasslin et al. |
| 2015/0178034 A1* | 6/2015 | Penilla ................ G06F 3/04842 345/1.1 |
| 2015/0181014 A1 | 6/2015 | Gerhardt et al. |
| 2015/0204965 A1 | 7/2015 | Magarida et al. |
| 2015/0210287 A1 | 7/2015 | Penilla et al. |
| 2015/0223151 A1 | 8/2015 | Lei et al. |
| 2015/0261219 A1* | 9/2015 | Cuddihy .................... B60J 3/04 701/23 |
| 2015/0261573 A1* | 9/2015 | Rausch ................. G06F 9/4881 718/106 |
| 2015/0278164 A1* | 10/2015 | Kim ...................... G06F 3/0483 715/273 |
| 2015/0283914 A1* | 10/2015 | Malone .................. B60H 1/004 701/49 |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0203661 A1 | 7/2016 | Pudar et al. |
| 2016/0214572 A1* | 7/2016 | Snider .................. B60R 25/241 |
| 2016/0248905 A1 | 8/2016 | Miller et al. |
| 2016/0332535 A1 | 11/2016 | Bradley et al. |

FOREIGN PATENT DOCUMENTS

| | | | |
|---|---|---|---|
| JP | 2011131833 A | * 7/2011 | ............ B60K 35/00 |
| WO | 2013052043 A1 | 11/2013 | |

OTHER PUBLICATIONS

Shahzada, "Touch Interaction for User Authentication," Thesis, Carleton University, Ottawa, Ontario, May 2014 (124 pages).

Napa SAE/BAE et al., "Biometric/Rich Gestures: A Novel Approach to Authentication on Multi/touch Devices," NYU/Poly, CHI 2012, May 5-10, 2012, Austin, TX (10 pages).

Services/Bluetooth Development Portal, last accessed May 30, 2015, https://developer.bluetooth.org/gatt/services/Pages/ServicesHome.aspx. (1 page).

Azad, "The Quick Guide to GUIDs," Better Explained / Math insights that click, last accessed May 24, 2015, http://betterexplained.com/articles (15 pages).

Goodwin, "Add/on module auto/unlocks your car when your phone is near," CNET, Car Tech, Nov. 19, 2013, http://www.cnet.com/news/add/on/module/auto/unlocks/your/car/when/your/phone/is/near (2 pages).

Hertz 24/7, "Book. Unlock. Go. You can reserve your vehicle anywhere, anytime / up to 10 days in advance," last accessed Jul. 28, 2015, https://www.hertz247.com/parkridge/en/us/About (3 pages).

Klosowski, "Unlock Your Car with a Bluetooth Powered Keyless Entry System," Lifehacker, Sep. 30, 2013, http://lifehacker.com/unlock/your/car/with/a/bluetooth/powered/keyless/entry/1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010/toyota/prius/touch/tracer/display/.

Gahran, "Vehicle owner's manuals // now on smartphones," CNN.com, Jan. 31, 2011, available at http://www.cnn.com/2011/TECH/mobile/01/31/car.manual.phone/.

Specification of the Bluetooth System, Version 42, "Master Table of Contents & Compliance Requirements," Dec. 2, 2014, https://www.bluetooth.or/en/us/specification/adopted/specifications. (2,772 pages).

General Motors Corporation; Pontiac GTO Owner's Manual; 2005; pp. 3-19 and 3-20; https://my.gm.com/content/dam/gm-mownercenter/gmna/dynamic/manuals/2006/pontiac/gto/2006_gto_owners.pdf.

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

* cited by examiner

INTEGRATION OF ADD-ON INTERIOR MODULES INTO DRIVER USER INTERFACE

TECHNICAL FIELD

Aspects of the disclosure generally relate to integration of add-on interior modules for the user interface of a head unit or other vehicle interface.

BACKGROUND

Sales of personal devices, such as smartphones and wearables, continue to increase. Thus, more personal devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of personal devices into the driving experience.

BLUETOOTH technology may be included in various user devices to allow the devices to communicate with one another. BLUETOOTH low energy (BLE) is another wireless technology designed to provide for communication of data between devices. As compared to BLUETOOTH, BLE offers communication of smaller amounts of data with reduced power consumption.

BLE devices may perform the roles of central device or peripheral device. Central devices wirelessly scan for advertisements by peripheral devices, while peripheral devices make the advertisements. Once the peripheral device connects to the central device, the peripheral device may discontinue the advertisement, such that other central devices may no longer be able to wirelessly identify it or connect to it until the existing connection is terminated.

BLE devices transfer data using concepts referred to as services and characteristics. Services are collections of characteristics. A central device may connect to and access one or more of the characteristics of a service of a peripheral device. Characteristics encapsulate a single value or data type having one or more bytes of data as well as zero or more descriptors that describe the value of the characteristic. The descriptors may include information such as human-readable descriptions, a range for the value of the characteristic, or a unit of measure of the value of the characteristics. A Service Discovery Protocol (SDP) may allow a device to discover services offered by other devices and their associated parameters. The services may be identified by universally unique identifiers (UUIDs).

SUMMARY

In a first illustrative embodiment, a system includes a display integrated into a vehicle; a wireless transceiver; and a processor, coupled to the display and transceiver, programmed to maintain a list of wireless factory-installed in-vehicle components, scan for add-on wireless in-vehicle components within the vehicle using the wireless transceiver, generate a user interface listing both the factory-installed wireless in-vehicle components and the add-on wireless in-vehicle components, and provide the listing to the display.

In a second illustrative embodiment, a method includes maintaining an in-vehicle component listing including factory-installed components and add-on components added after a vehicle is built; scanning, using a wireless transceiver, for add-on in-vehicle components within the vehicle; removing a first add-on wireless in-vehicle component from the listing responsive to failure to locate the first in-vehicle component during the scanning; and adding a second add-on wireless in-vehicle component to the listing located during the scanning.

In a third illustrative embodiment, a computer program product embodied in non-transitory computer readable storage having instructions for programming a processor of a vehicle in communication with a wireless transceiver to control a display, including instructions for maintaining a list of installed in-vehicle components, scanning for current in-vehicle components within the vehicle using the wireless transceiver, updating the list based on the scanning, and sending, to the display, a generated user interface listing of the current in-vehicle components.

DETAILED DESCRIPTION

Figure 1A:
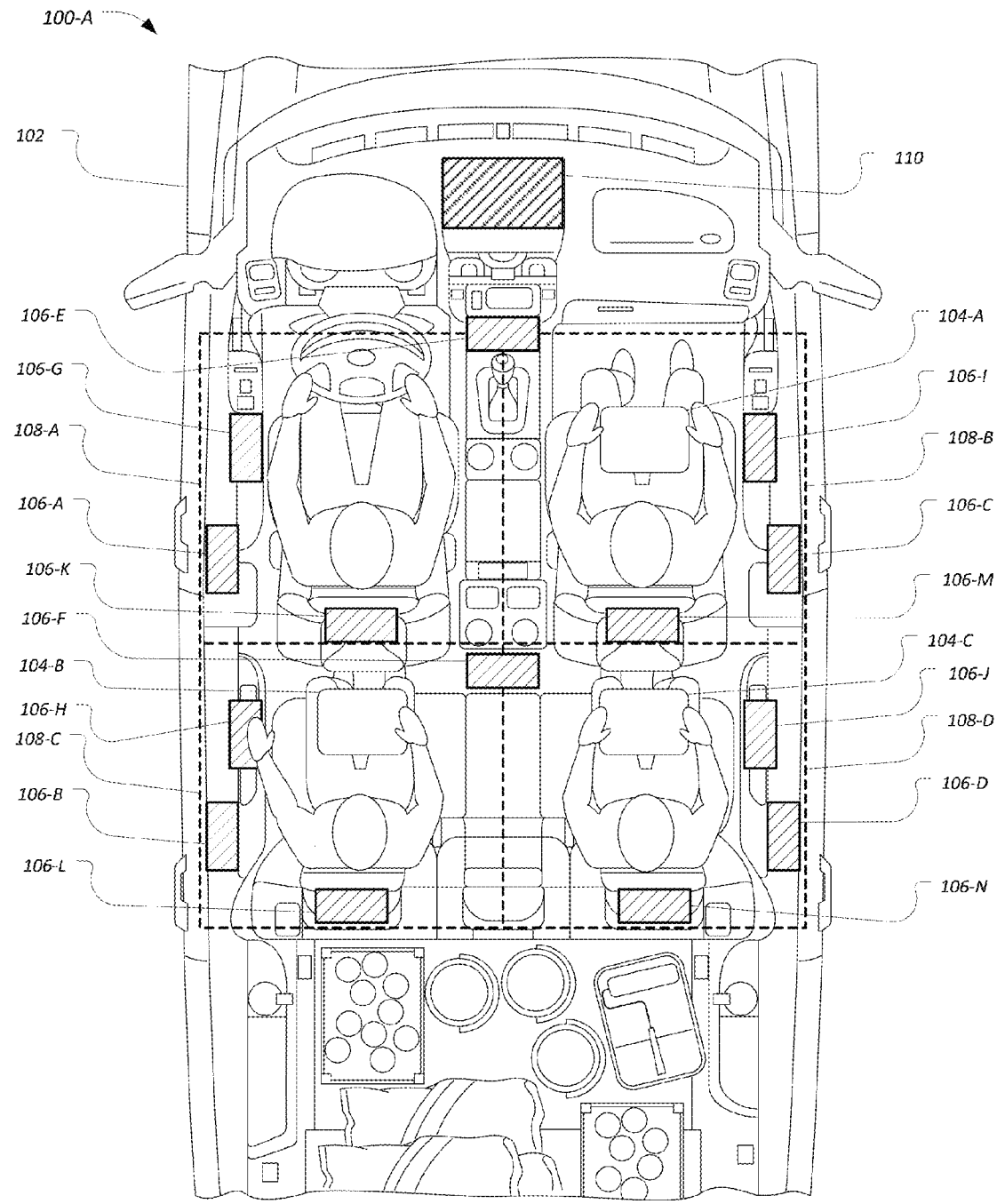
FIG. 1A illustrates an illustrates an example system including a vehicle having a mesh of in-vehicle components configured to interact with a vehicle computing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Traditional vehicle interior components, such as reading lights or speakers, may be updated to incorporate a communication interface such as BLE. As BLE has a relatively low processor footprint, processors of the interior components may be able to integrate functionality of the communication interface without requiring additional or more powerful processors. These enhanced components of the vehicle interior may be referred to as in-vehicle components.

The in-vehicle components may include components integrated into the vehicle at the factory. As some examples, factory-installed in-vehicle components may include overhead lights, speakers, and built-in headrest video screens. Additionally, the in-vehicle components may include aftermarket components that may be added to or removed from the vehicle by vehicle occupants. These removable in-vehicle components may include, as some examples, car seats with integrated vibrate or music functionality, or window shades with remote up-down functionality. As the in-vehicle components may be installed or removed, the in-vehicle components available within the vehicle may change over time.

A vehicle computing system may include a communication interface such as BLE. Using the communication interface, the vehicle computing system may be configured to discover, identify, and interact with the in-vehicle components located within the vehicle. The vehicle computing system may perform the discovery of in-vehicle components periodically. As some other examples, the vehicle computing system may perform the discovery in response to a user command to re-identify in-vehicle components, or upon anther trigger condition, such as entry of a vehicle occupant, upon vehicle key-on, or upon initialization of the vehicle computing system itself.

The vehicle computing system may further provide a user interface in which the configuration of the in-vehicle components may be reviewed and adjusted. Accordingly, by using information advertised by the in-vehicle modules, the vehicle computing system may be able to provide a dynamic user interface descriptive of the currently available in-vehicle modules and services. Moreover, by using connectivity such as BLE that does not require access to the vehicle bus, development of the in-vehicle components may be performed independent of development of the vehicle systems, and without the validation required for components that do access the vehicle bus.

FIG. 1A illustrates an example system 100 including a vehicle 102 having a mesh of in-vehicle components 106 configured to interact with a vehicle computing system 110. The system 100 may be configured to allow the users, such as vehicle occupants, to use the vehicle computing system 110 to seamlessly interact with the in-vehicle components 106 in the vehicle 102 or with any other framework-enabled vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by passenger-side rear may be associated with the fourth zone 108-D. It should be noted that the illustrated portion of the vehicle 102 in FIG. 1A is merely an example, and more, fewer, and/or differently located in-vehicle components 106 and zones 108 may be used.

The vehicle computing system 110 may be configured to provide telematics services to the vehicle 102. These services may include, as some non-limiting possibilities, navigation, turn-by-turn directions, vehicle health reports, local business search, accident reporting, and hands-free calling. In an example, the vehicle computing system 110 may include the SYNC system manufactured by The Ford Motor Company of Dearborn, Mich.

Figure 1B:
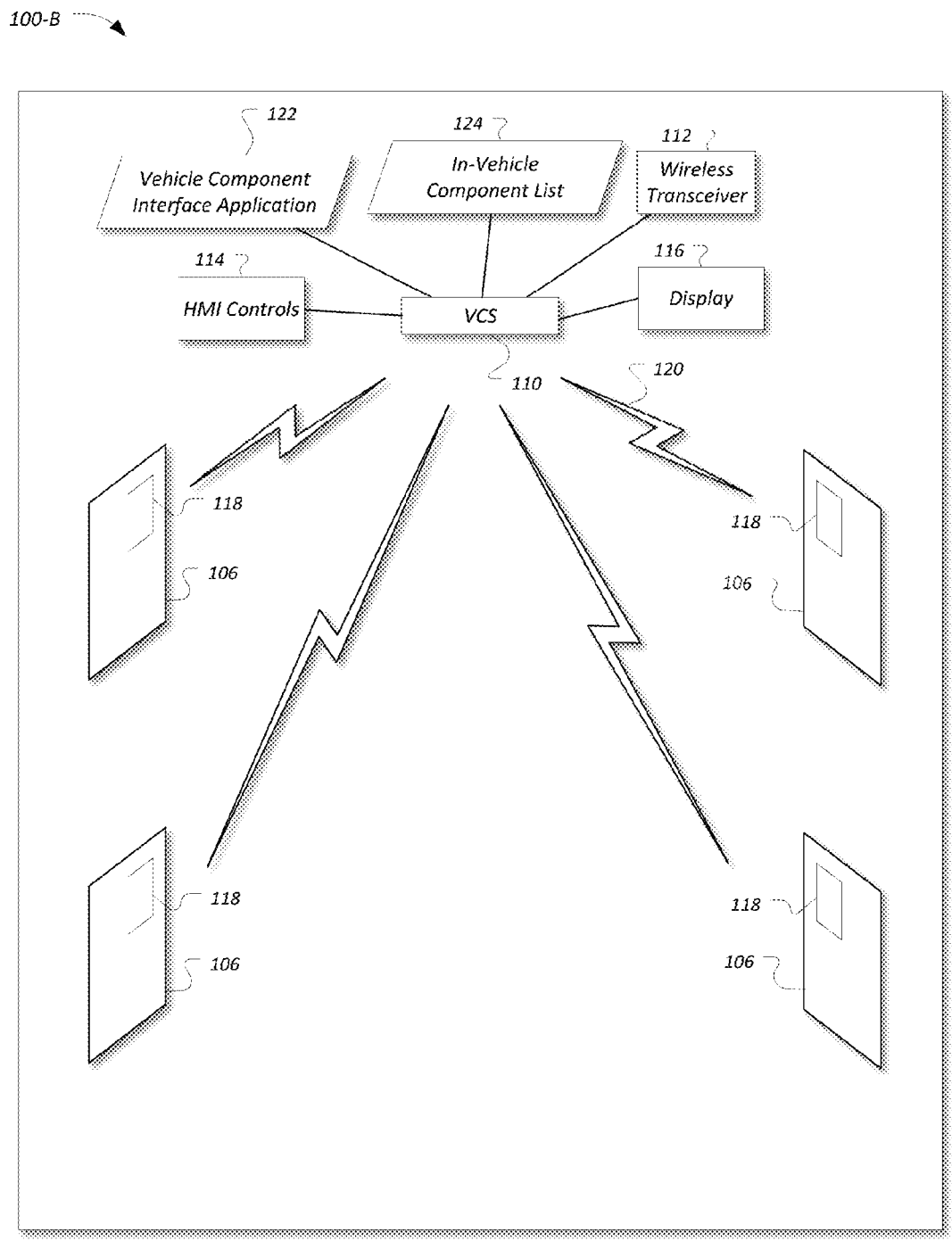
FIG. 1B illustrates an example vehicle computing system equipped with a wireless transceiver configured to facilitate detection of and communication with in-vehicle components.

Referring to FIG. 1B, the vehicle computing system 110 may interface with a wireless transceiver 112 configured to communicate with the in-vehicle components 106 located within the vehicle 102. In an example, the wireless transceiver 112 may support communication over BLUETOOTH and/or BLE.

The vehicle computing system 110 may also receive input from human-machine interface (HMI) controls 114 configured to provide for occupant interaction with the vehicle 102. For instance, the vehicle computing system 110 may interface with one or more buttons or other HMI controls 114 configured to invoke functions on the vehicle computing system 110 (e.g., steering wheel audio buttons, a push-to-talk button, instrument panel controls, etc.). The vehicle computing system 110 may also drive or otherwise communicate with one or more displays 116 configured to provide visual output to vehicle occupants. In some cases, the display 116 may be a touch screen further configured to receive user touch input (e.g., operating as an HMI control 114), while in other cases the display 116 may be an output device only, without also having input capabilities.

The vehicle computing system 110 may be further configured to communicate with other components of the vehicle 102 via one or more in-vehicle networks. The in-vehicle networks may include one or more of a vehicle controller area network (CAN), an Ethernet network, and a media oriented system transfer (MOST), as some examples. The in-vehicle networks may allow the vehicle computing system 110 to communicate with other vehicle systems, such as a vehicle modem (which may not be present in some configurations), a global positioning system (GPS) module configured to provide current vehicle location and heading information, and various other vehicle controllers.

Each in-vehicle component 106 may also be equipped with a wireless transceiver 118. The wireless transceiver 118 may be configured to facilitate communication with the vehicle computing system 110. In an example, the wireless transceiver 118 may include a wireless device, such as a Bluetooth Low Energy transceiver. In an example, the wireless transceiver 112 of the vehicle computing system 110 may communicate data with the wireless transceiver 118 of the in-vehicle component 106 over a wireless connection 120. The wireless connections 120 may be a BLE connection, but other types of local wireless connection 120 may be utilized as well.

The vehicle component interface application 122 may be an application installed to the vehicle computing system 110. The vehicle component interface application 122 may be configured to facilitate vehicle occupant access to features of the in-vehicle components 106 exposed for networked configuration via the wireless transceiver 118. In some cases, the vehicle component interface application 122 may be configured to identify the available in-vehicle components 106, and maintain an in-vehicle component list 124 of the available in-vehicle components 106. In an example, the in-vehicle component list 124 may include a listing of factory-installed wireless in-vehicle components 106 as well as a listing of add-on wireless in-vehicle components 106 detected by the vehicle component interface application 122. The vehicle component interface application 122 may also be configured to identify the available features and current settings of the identified in-vehicle components 106. The vehicle component interface application 122 may be further configured to display a user interface descriptive of the available features of the in-vehicle components 106 on the in-vehicle component list 124, receive user input, and provide commands to the in-vehicle components 106 based on the user input to allow the user to control the features of the in-vehicle components 106. Thus, the system 100 may be configured to allow vehicle occupants to seamlessly interact with the in-vehicle components 106 in the vehicle 102.

The vehicle component interface application 122 executed by the vehicle computing system 110 may be configured to scan for and update the in-vehicle component list 124 of available in-vehicle components 106. As some examples, the scanning may be performed periodically, responsive to a user request to refresh, or upon activation of the vehicle component interface application 122. In examples where the scanning is performed automatically, the correct set of functionality is continuously refreshed and the user interface of the vehicle component interface application 122 is updated to reflect the changes in installed or removed in-vehicle components 106.

Figure 2A:
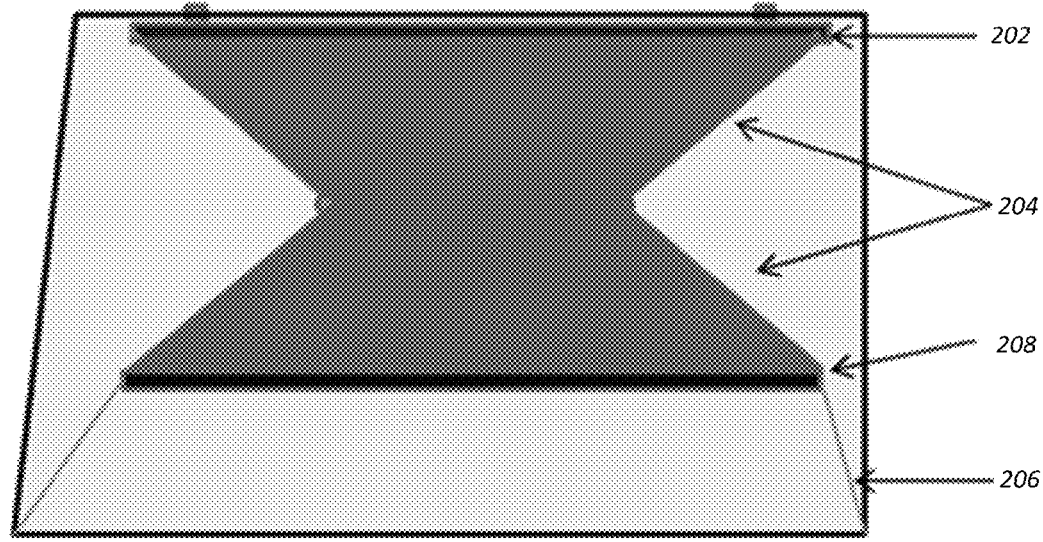
FIGS. 2A and 2B illustrate an example removable add-on in-vehicle component.
Figure 2B:
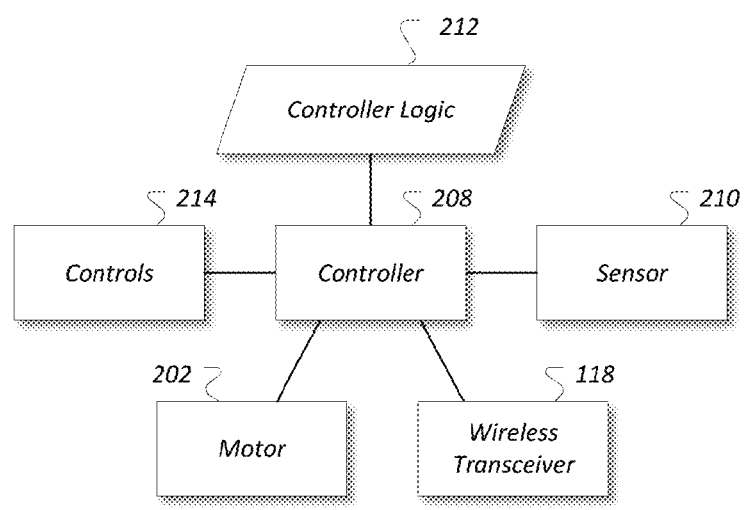

FIGS. 2A and 2B illustrate an example removable add-on in-vehicle component 106. As shown in FIG. 2A, the removable in-vehicle component 106 is a smart-shade for attachment to a vehicle 102 window. The smart-shade in-vehicle component 106 may include a motor 202 for raising and lowering the shade, semi-rigid jointed side shafts 204 to stretch the shade fabric open and fold it closed, and stretchable anchors 206 to hold the shade in place. The smart-shade in-vehicle component 106 may further include a controller 208 programmed to direct the motor 202 to open and close.

As shown in the block diagram of FIG. 2B, the smart-shade may further include other components, such as an ultraviolet or other light sensor 210 configured to monitor light conditions and provide the light intensity information to the controller 208. The controller 208 may utilize controller logic 212 to allow the controller to automatically open and close the shade. For instance, the controller logic 212 may include a first light threshold level above which the controller 208 directs the motor 202 to close the shade, and a second light threshold level below which the controller 208 directs the motor 202 to open the shade. The controller 208 may also be programmed to direct the motor 202 in accordance with user input to controls 214 of the smart shade. The controls 214 may include, in an example, open and close buttons that, when selected, send signals to the controller 208 to direct the shade to raise or lower. The controller logic 212 may accordingly receive the signals from the controls 214 and command the motor 202 to raise or lower the shade. The controller 208 may also be programmed to receive wireless commands from the wireless transceiver 118 to control the shade, as well as to direct the wireless transceiver 118 to broadcast information regarding the available functions and current status of the smart-shade (e.g., open, close, etc.).

Figure 3:
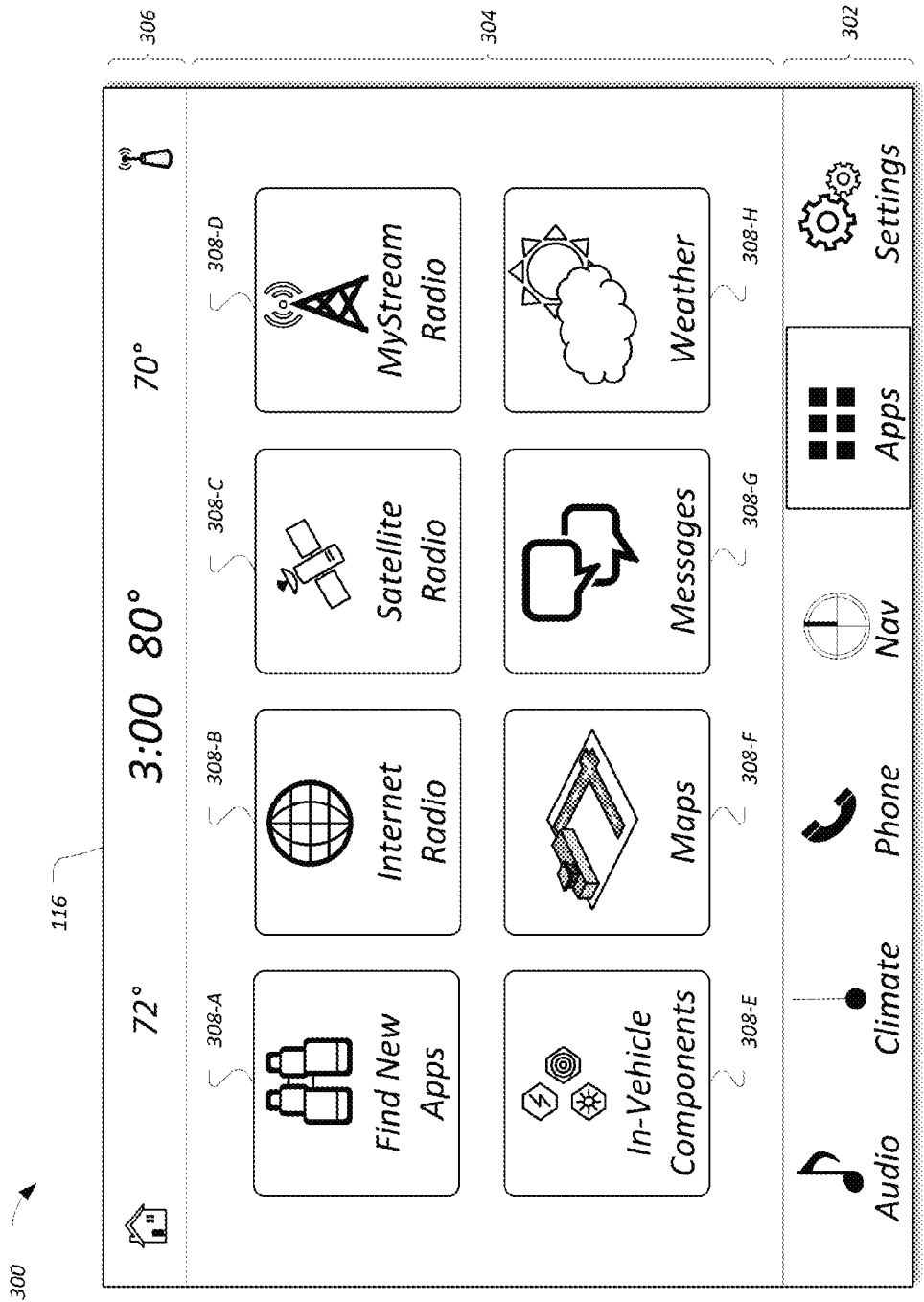
FIG. 3 illustrates an example user interface for selection of applications for use on a display of the vehicle computing system.

FIG. 3 illustrates an example user interface 300 for selection of applications for use on a head unit display 116 of the vehicle computing system 110. The head unit display 116 may be driven, for example, by a video connection to the vehicle computing system 110 of the vehicle 102. The user interface 300 may include a category listing 302 of one or more screen of content to be displayed in the main screen area 304 of the head unit display 116. As some examples, the category listing 302 may include an audio screen from which configuration of vehicle 102 audio settings may be performed, a climate control screen from which vehicle 102 climate control settings may be configured, a phone screen from which calling services may be utilized, a navigation screen from which maps and routing may be performed, an applications screen from which installed applications may be invoked, and a settings screen from which backlighting or other general settings of the head unit display 116 may be accessed. The user interface 300 may also include a general information area 306 from which time, current temperature, and other information may remain visible to the user, regardless of the specific screen or application that is active in the main screen area 304.

As shown, the applications screen is illustrated as selected from the category listing 302, and the main screen area 304 is illustrated as showing a listing of available applications that may be invoked. These applications may include, for example, a find new apps application item 308-A, an internet radio item 308-B, a satellite radio item 308-C, a streaming radio item 308-D, an icon 308-E for selection of the vehicle component interface application 122, a maps item 308-F, a messages icon 308-G, and a weather icon 308-G. To invoke the vehicle component interface application 122 to control the in-vehicle components 106, the user may select the icon 308-E from the user interface 300.

Figure 4A:
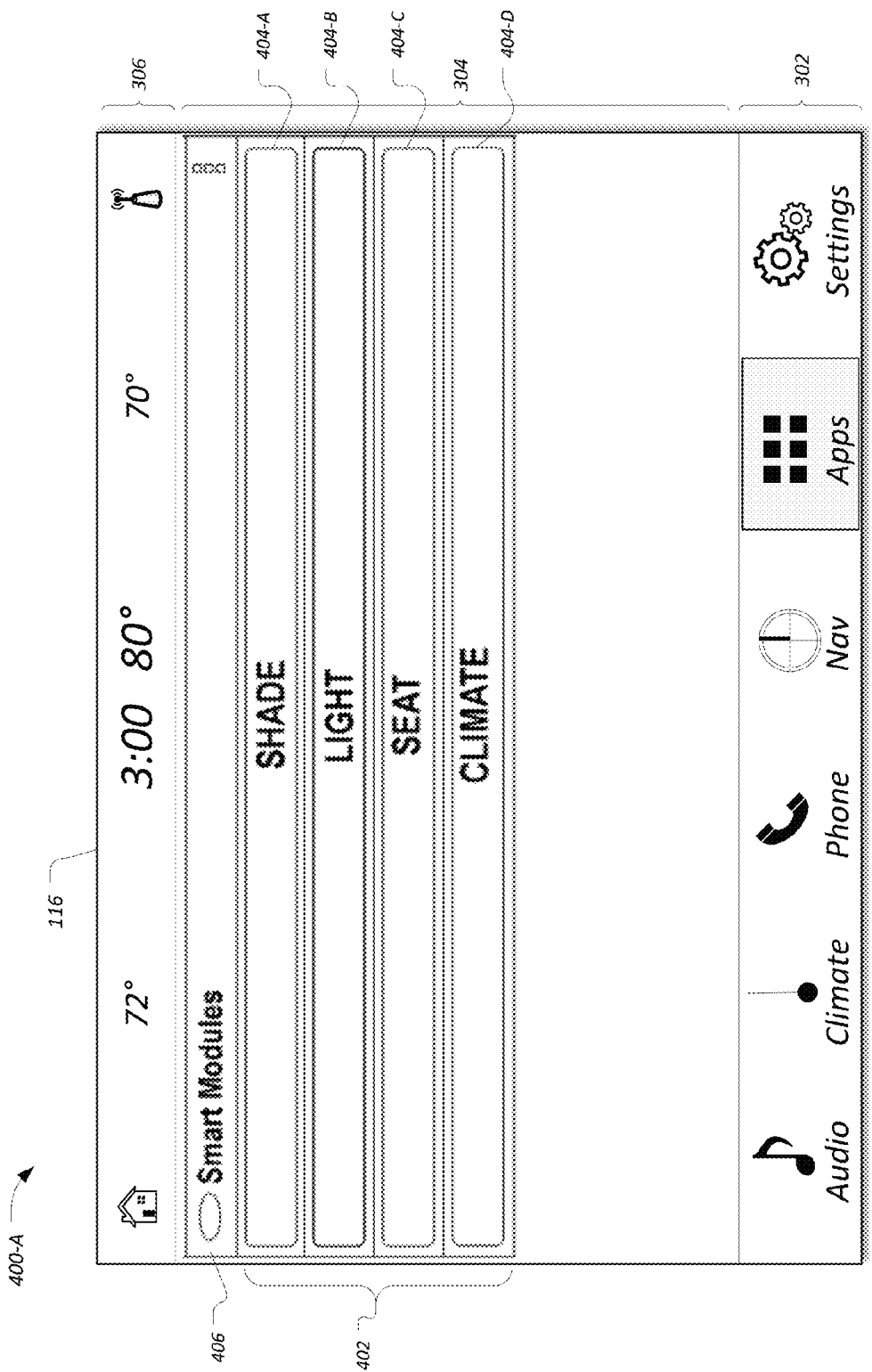
FIG. 4A illustrates an example user interface of the vehicle component interface application illustrating in-vehicle components detected by the vehicle computing system.

FIG. 4A illustrates an example user interface 400-A of the vehicle component interface application 122 illustrating in-vehicle components 106 detected by the personal device 104. As shown, the user interface 400-A may be presented by the vehicle component interface application 122 on the display 116 of the vehicle computing system 110, and may include a listing 402 configured to display selectable list entries 404-A through 404-D (collectively 404) indicative of the identified in-vehicle components 106. Each of the selectable list entries 404 may indicate a detected in-vehicle component 106 family available for configuration by the user. Thus, the selectable list entries 404 may be based on the in-vehicle components 106 maintained by the vehicle computing system 110 on the in-vehicle component list 124. The user interface 400-A may also include a title label 406 to indicate to the user that the user interface 400-A is displaying a menu of in-vehicle components 106 as detected by the vehicle component interface application 122.

As illustrated, the listing 402 of the vehicle component interface application 122 includes an entry 404-A for a shade in-vehicle component 106 (e.g., such as described above with respect to FIGS. 2A and 2B), an entry 404-B for a light in-vehicle component 106, an entry 404-C for a seat in-vehicle component 106, and an entry 404-D for a climate control in-vehicle component 106. Notably, the listing 402 may include a unified listing of both factory-installed in-vehicle components 106 and add-on in-vehicle components 106. The listing 402 may operate as a menu, such that a user of the user interface 400-A may be able to scroll through list entries of the list control 402 (e.g., using up and down arrow buttons and a select button to invoke a selected menu item). In some cases, the list control 402 may be displayed on a touch screen such that the user may be able to touch the list control 402 to select and invoke a menu item. As another example, the user interface 400-A may support voice command selection of the menu items. For example, to invoke the options of the light in-vehicle component 106, the user may speak the voice command "LIGHT." It should be noted that the illustrated entries 404 are merely examples, and more or different in-vehicle components 106 may be available.

Figure 4B:
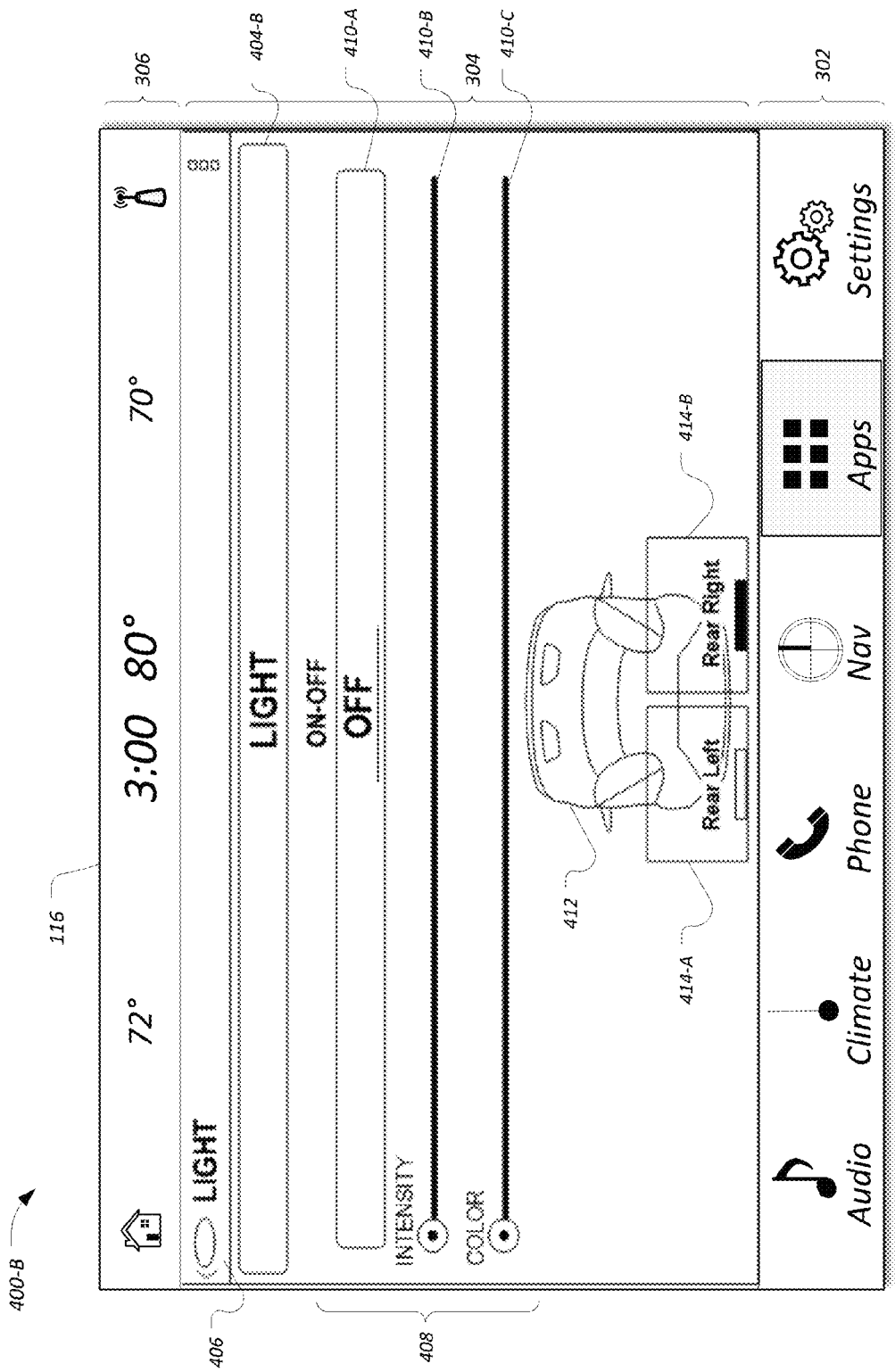
FIG. 4B illustrates an example user interface for control of a factory-installed in-vehicle component.

FIG. 4B illustrates an example user interface 400-B for control of a factory-installed in-vehicle component 106. The user interface 400-B may be provided to the display 116 of the vehicle computing system 110. In an example, the user interface 400-B may display functions of a lighting in-vehicle component 106 responsive to user input to the entry 404-B in the user interface 400-A. The user interface 400-B may also include the title label 406 to indicate to the user that the user interface 400-B is displaying functions of the selected lighting in-vehicle component 106.

As shown, the user interface 400-B may include a listing 408 configured to display selectable controls 410-A through 410-C (collectively 410) based on the identified in-vehicle components 106 features. Each of the selectable controls 410 may indicate a function of the indicated in-vehicle component 106 that is available for configuration by the user. The user interface 400-B may also include a title label 308 to indicate to the user that the user interface 400-B is displaying a menu of functions of the indicated in-vehicle component 106. In some cases, when the title label 308 is selected the user interface 400-B may revert back to the user interface 300 allowing the user to return to the listing of currently active in-vehicle components 106.

As illustrated, the listing 408 includes a control 410-A for toggling on and off the light of the in-vehicle component 106, a control 410-B for specifying an intensity of the light in-vehicle component 106, and a control 410-C for specifying a color of the light of the in-vehicle component 106. The listing 408 may also provide for scrolling in cases where there are more controls 410 that may be visually represented in the display 116 at one time. In some cases, the control 410 may be displayed on a touch screen such that the user may be able to touch the controls 410 to make adjustments to the functions of the in-vehicle component 106. As another example, the user interface 400-B may support voice commands. For example, to toggle the light on, the user may speak the voice command "LIGHT ON," or simply "ON." It should be noted that the illustrated controls 410 are merely examples, and more or different functions or layouts of functions of the in-vehicle component 106 may be utilized.

It should be noted that while the controls 410 of the user interface 400-B include a toggle switch used to turn the light on and off, and two sliders used to adjust intensity and ambient color based on the characteristics, the actual physical in-vehicle component 106 may have a different user interface 400-B. For instance, the in-vehicle component 106 may include a simpler user interface, such as a single mechanical or proximity switch to turn the light on and off, so the occupant would not have to depend on use of the vehicle computing system 110 to utilize basic functionality of the in-vehicle component 106.

In some examples, the user interface 400-B may further include a zone interface 412 to allow a user of the display 116 to switch among the in-vehicle components 106 within different zones 108. As one possibility, the zone interface 412 may include a control 414-A for selection of a driver-side rear zone 108-C, and a control 414-B for selection of a passenger-side rear zone 108-D (collectively controls 414). Responsive to selection of one of the controls 414, the user interface 400-B may accordingly display the controls 410 of corresponding in-vehicle component 106 for the selected zone 108. For instance, if the light controls in the zone 108-C is currently being displayed and the user selects the control 414-B to display the corresponding control for the zone 108-D, the user interface 400-B may display the functions of the light control for the zone 108-D.

Figure 4C:
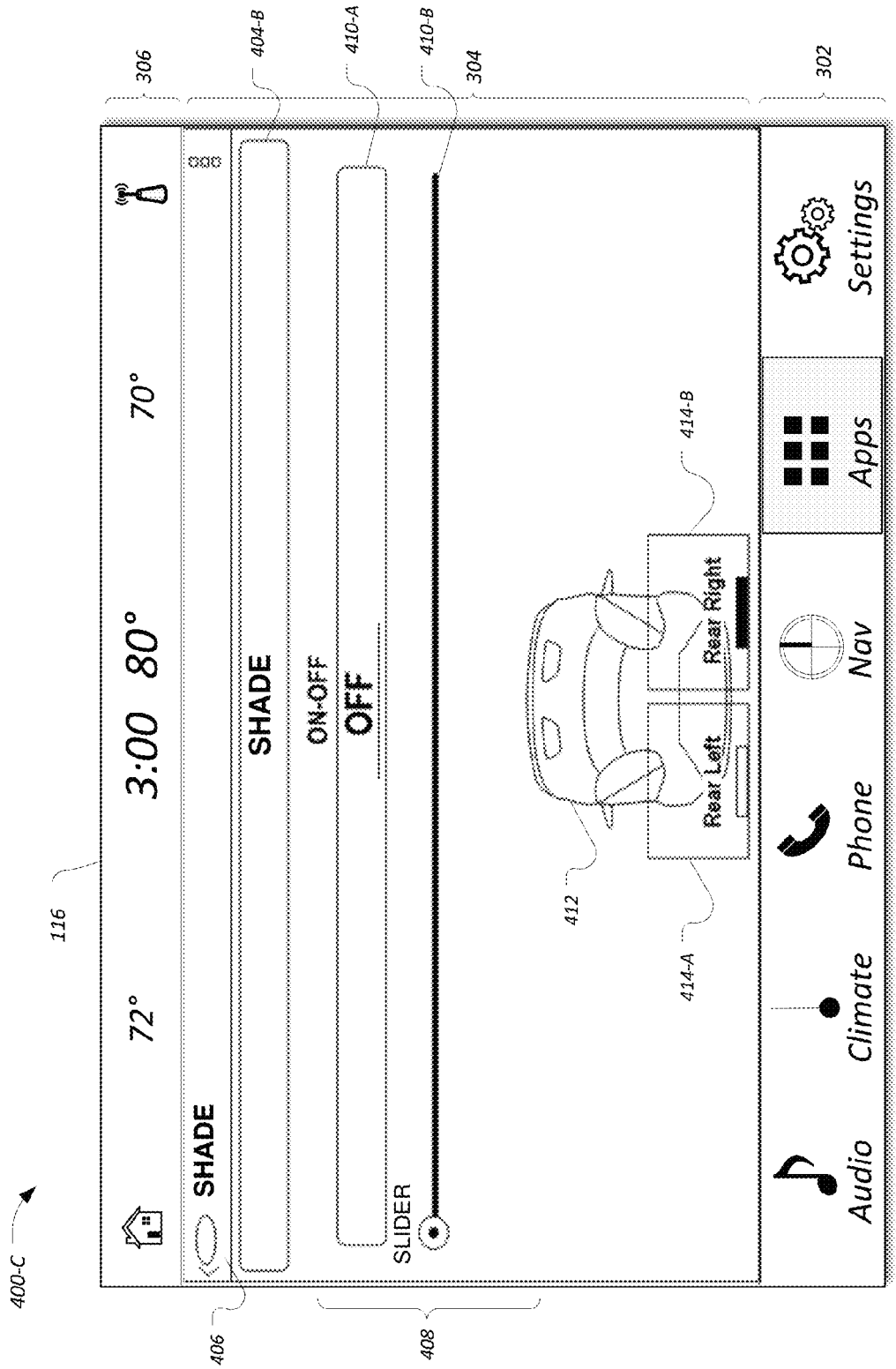
FIG. 4C illustrates an example user interface for control of an add-on in-vehicle component.

FIG. 4C illustrates an example user interface 400-C for control of an add-on in-vehicle component 106. As with the user interface 400-B, the user interface 400-C may also be provided to the display 116 of the vehicle computing system 110. In an example, the user interface 400-B may display functions of a shade in-vehicle component 106 responsive to user input to the entry 404-A in the user interface 400-A. The user interface 400-C may also include the title label 406 to indicate to the user that the user interface 400-C is displaying functions of the selected shade in-vehicle component 106. Thus, the vehicle component interface application 122 may provide for a consistent user interface across factory-installed and add-on in-vehicle components 106.

As illustrated, the listing 408 includes a control 410-A for toggling on and off the shade of the in-vehicle component 106, and a control 410-B for specifying a location of the shade (e.g., how far up or down the shade is to be placed). Responsive to user input to the control 410-A or control 410-B, the vehicle computing system 110 may wirelessly command the shade in-vehicle component 106. In an example, if the user selects to adjust the shade position using the control 410-B, the vehicle computing system 110 may utilize the wireless transceiver 112 to send a wireless command addressed to the wireless transceiver 118 of the shade in-vehicle component 106. The controller 208 of the shade in-vehicle component 106 may accordingly receive the command, and utilize the controller logic 212 to direct the motor 202 to raise or lower the shade to the desired position. Notably, these operations may be performed without requiring the vehicle computing system 110 or the shade in-vehicle component 106 to communicate with one another across the vehicle bus.

Figure 5:
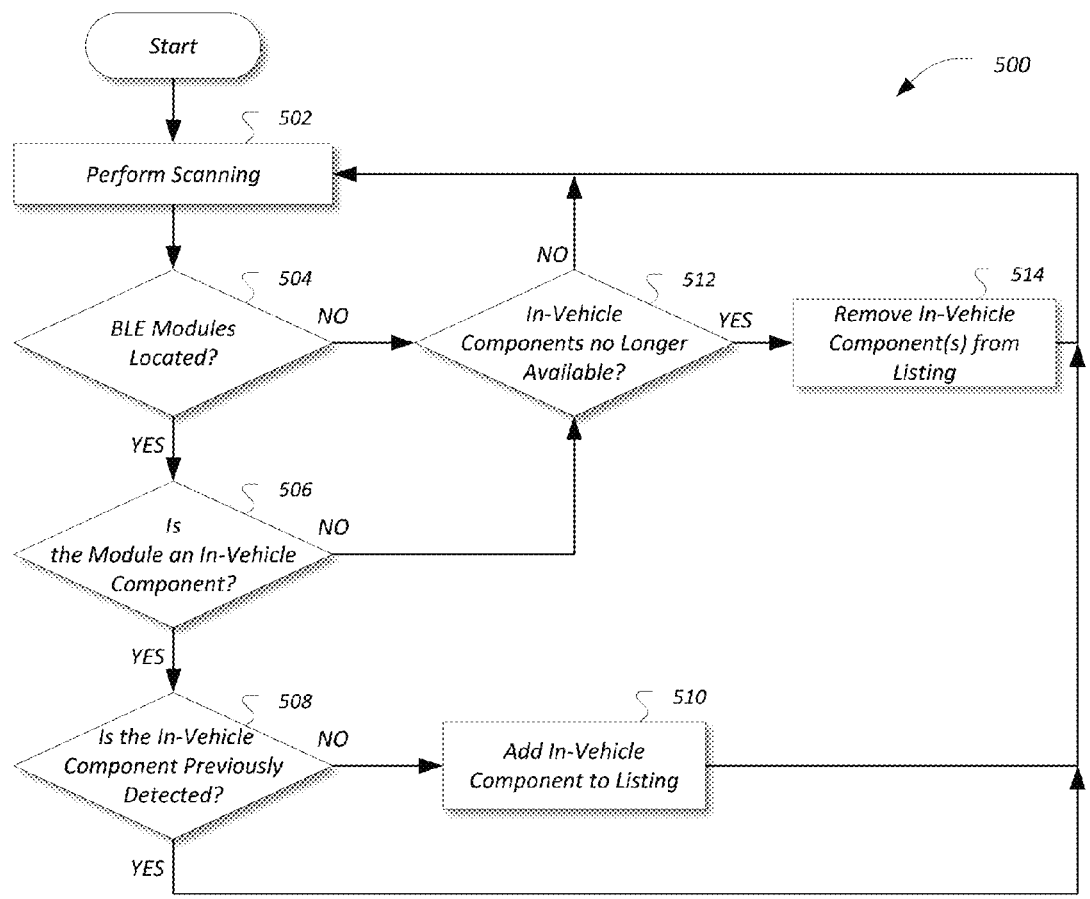
FIG. 5 illustrates an example process for scanning for in-vehicle components by the vehicle computing system.

FIG. 5 illustrates an example process 500 for scanning for in-vehicle components 106 by the vehicle computing system 110. In an example, the process 500 may be performed by the vehicle computing system 110 executing the vehicle component interface application 122.

At operation 502, the vehicle computing system 110 performs scanning. In an example, a scanning service of the vehicle component interface application 122 executed by the vehicle computing system 110 may utilize the wireless transceiver 112 to scan for BLE advertisements. The triggering of the scanning may be performed periodically, in an example. As some other examples, the vehicle computing system 110 may perform the discovery in response to a user command to re-identify in-vehicle components 106, or upon anther trigger condition, such as entry of a vehicle 102 occupant, upon vehicle 102 key-on, or upon initialization of the vehicle computing system 110 and/or the vehicle component interface application 122. At 504, the vehicle computing system 110 determines whether any BLE modules are present. If so, control passes to operation 506. Otherwise control passes to operation 512.

At 506, the vehicle computing system 110 determines whether the detected BLE modules are in-vehicle components 106. In an example, when a module is found, the vehicle component interface application 122 parses the service UUID of the in-vehicle component 106 to determine whether the service UUID is indicative of an in-vehicle component 106. For instance, the vehicle component interface application 122 may identify whether the service UUID is within an identifier range associated with being an in-vehicle component 106. If the module is an in-vehicle component 106, control passes to operation 508. Otherwise, control passes to operation 502.

The vehicle computing system 110 determines whether the detected in-vehicle component 106 was detected previously at 508. For instance, the vehicle computing system 110 may maintain the in-vehicle component list 124 indicative of the currently active in-vehicle components 106, which, in an example, may be used to generate the listing 402 of the vehicle component interface application 122 of the user interface 400-A. The vehicle computing system 110 may compare a service identifier, address, or other information of the detected in-vehicle component 106 to the service identifiers, addresses, or other information of the previously-detected in-vehicle components 106 of the in-vehicle component list 124 to determine whether the in-vehicle component 106 was previously detected. If the in-vehicle component 106 was previously detected, control passes to operation 502. Otherwise, control passes to operation 510.

At operation 510, the vehicle computing system 110 adds the newly-detected in-vehicle component 106 to the in-vehicle component list 124. In an example, the vehicle component interface application 122 may add information from the advertisement to the in-vehicle component list 124, such as the service identifier of the in-vehicle component 106, an address to which the in-vehicle component 106 may be accessed, and/or other information regarding the in-vehicle component 106, such as timeout information from the advertisement. After operation 510, control returns to operation 502 to perform scanning.

In the operations of element 512, the vehicle computing system 110 determines whether any of the in-vehicle components 106 should be removed from the in-vehicle component list 124. In an example, the vehicle component interface application 122 may determine whether any timeouts of the in-vehicle components 106 that are on the in-vehicle component list 124 have expired. In another example, the vehicle component interface application 122 may determine whether any previously-detected in-vehicle components 106 are no longer located during the scan. If so, control passes to operation 620 to remove those in-vehicle components 106 from the in-vehicle component list 124. If not, control returns to operation 502 to perform scanning.

Thus, by using the process 500, the vehicle computing system 110 may be able to wirelessly maintain the in-vehicle component list 124 of the available in-vehicle components 106, without requiring access to the vehicle bus.

Figure 6:
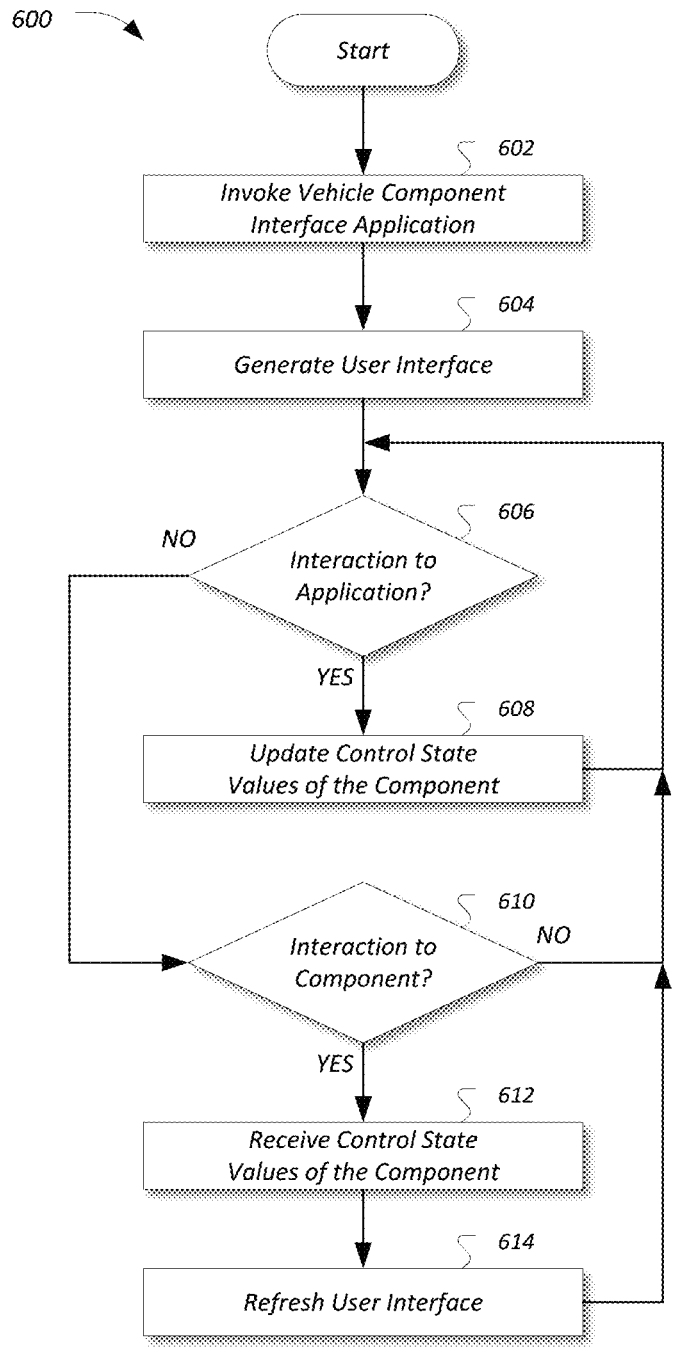
FIG. 6 illustrates an example process for displaying the user interface for control of the in-vehicle components.

FIG. 6 illustrates an example process 600 for displaying the user interface 400 for control of the in-vehicle components 106. In an example, the process 600 may be performed by the in-vehicle component 106 and the vehicle computing system 110 in communication over a wireless connection.

At operation 602, the vehicle computing system 110 receives an indication to invoke the user interface 400. In an example, the vehicle computing system 110 may receive an indication that the user selected the in-vehicle components icon 308-E from the user interface 300. At 604, the vehicle computing system 110 generates the user interface 400. The generated user interface 400 may include a listing 402 of controls 404 based on the in-vehicle component list 124 detection performed in the process 500.

The vehicle computing system 110 determines at 606 whether there is user interaction with the vehicle component interface application 122. In an example, the vehicle component interface application 122 may receive input to a user interface 400 provided to the display 116 to adjust the state of the in-vehicle component 106. As some examples, the user may provide user input to one or more controls 410 as described above with respect to the FIGS. 4B and 4C. If an interaction is received, control passes to operation 608. Otherwise control passes to operation 610.

At 608, the vehicle computing system 110 updates the control values of the in-vehicle component 106. In an example, the vehicle component interface application 122 utilizes the wireless transceiver 112 to send a message to the in-vehicle component 106 to update the state of the in-vehicle component 106. For instance, responsive to the user selecting from the user interface 400 for the smart-shade in-vehicle component 106 be rolled down, the vehicle component interface application 122 may direct the wireless transceiver 112 to send a message addressed to the wireless transceiver 118 of the smart-shade in-vehicle component 106 requesting for the shade to be rolled up or down. After operation 608, control passes to operation 606.

In the operations of 610, the in-vehicle component 106 determines whether there is an update to the state of the in-vehicle component 106. In an example, the user may adjust a control value of the in-vehicle component 106 using the controls of the in-vehicle component 106 (e.g., a user may use a control on the smart-shade in-vehicle component 106 to direct the shade to roll down). In another example, the in-vehicle component 106 may adjust its own state (e.g., the smart-shade in-vehicle component 106 may roll down based on detection of increased light conditions). This interaction may cause the in-vehicle component 106 to broadcast a message or advertise that a change in the state of the in-vehicle component 106 has occurred. If a control value of the in-vehicle component 106 has changed, control passes to operation 612. Otherwise, control passes to operation 606.

At operation 612, the vehicle computing system 110 receives control state values from the in-vehicle component 106. In an example, the vehicle component interface application 122 may acquire the current state of the controls from the in-vehicle component 106 due to the in-vehicle component 106 using BLE to advertise a change in state or by broadcasting to the vehicle computing system 110 the change in state.

At 614, the vehicle computing system 110 refreshes the user interface 400. In an example, the vehicle component interface application 122 may indicate the changed state of the controls (e.g., on, off, volume level, shade up/down, etc.) based on the state of the controls received at operation 612. After operation 614, control passes to operation 606.

Computing devices described herein, such as the personal devices 104, in-vehicle components 106, vehicle computing system 110, and controller 208, generally include computer-executable instructions, where the instructions may be executable by one or more computing devices such as those listed above. Computer-executable instructions, such as the instructions of the vehicle component interface application 122 or controller logic 212, may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a display integrated into a vehicle;
a wireless transceiver; and
a processor, coupled to the display and transceiver, programmed to
maintain a list of wireless factory-installed in-vehicle components,
scan for add-on wireless in-vehicle components within the vehicle using the wireless transceiver,
generate a user interface listing both the factory-installed wireless in-vehicle components and the add-on wireless in-vehicle components, and
provide the listing to the display.

2. The system of claim 1, wherein the processor is further programmed to:
receive user input to the display requesting a change in state of one of the in-vehicle components, and
utilize the wireless transceiver to update the state of the one of the in-vehicle components.

3. The system of claim 2, wherein the change in state is one of rolling down a smart-shade in-vehicle component or rolling up a smart-shade in-vehicle component.

4. The system of claim 1, wherein the processor is further programmed to:
receive an indication of a change in state from one of the in-vehicle components; and
update the state of the one of the in-vehicle components in the list responsive to the indication.

5. The system of claim 4, wherein the change in the state is an automatic change based on input to the one of the in-vehicle components from a light sensor of the in-vehicle component.

6. The system of claim 4, wherein the change in the state is in response to input received to a user interface control of the one of the in-vehicle components.

7. The system of claim 1, wherein the display is a head unit of the vehicle, and the processor is a telematics control unit processor.

8. A method comprising:
maintaining in a storage by a processor of a vehicle an in-vehicle component listing including factory-installed components and add-on components added after a vehicle is built;
scanning, using a wireless transceiver as directed by the processor, for add-on in-vehicle components within the vehicle;
removing, by the processor, a first add-on wireless in-vehicle component from the listing responsive to failure to locate the first in-vehicle component during the scanning; and
adding, by the processor, a second add-on wireless in-vehicle component to the listing located during the scanning.

9. The method of claim 8, further comprising:
generating a user interface listing including both the factory-installed components and the add-on components; and
providing the user interface listing to a display.

10. The method of claim 9, where the display is a head unit of the vehicle.

11. The method of claim 9, further comprising:
receiving user input to the display requesting a change in state of one of the in-vehicle components; and
utilizing the wireless transceiver to update the state of the one of the in-vehicle components.

12. The method of claim 11, wherein the change in state is one of rolling down a window shade in-vehicle component or rolling up a window shade in-vehicle component.

13. The method of claim 9, further comprising:
receiving an indication of a change in state from one of the in-vehicle components; and
updating the state of the one of the in-vehicle components in the user interface responsive to the indication.

14. The method of claim 13, wherein the change in the state is one of: an automatic change based on input to the one of the in-vehicle components from a sensor of the in-vehicle component, or in response to input received to a user interface control of the one of the in-vehicle components.

15. A computer program product embodied in non-transitory computer readable storage having instructions for programming a processor of a vehicle in communication with a wireless transceiver to control a display, comprising instructions for:
maintaining a list of installed in-vehicle components,
scanning for current in-vehicle components within the vehicle using the wireless transceiver,
updating the list based on the scanning, and
sending, to the display, a generated user interface listing of the current in-vehicle components.

16. The computer program product of claim 15, further comprising instructions for maintaining, in the list, identifiers of factory-installed components and add-on components added after a vehicle is built.

17. The computer program product of claim 15, further comprising instructions for removing an add-on wireless in-vehicle component from the listing responsive to failure to locate the wireless in-vehicle component during the scanning.

18. The computer program product of claim 15, further comprising instructions for adding an add-on wireless in-vehicle component to the listing located during the scanning.

* * * * *